(12) United States Patent
Kim et al.

(10) Patent No.: US 12,530,523 B2
(45) Date of Patent: Jan. 20, 2026

(54) METHOD, APPARATUS, SYSTEM, AND COMPUTER PROGRAM FOR CORRECTING TABLE COORDINATE INFORMATION

(71) Applicant: SAMSUNG SDS CO., LTD., Seoul (KR)

(72) Inventors: Taehoon Kim, Seoul (KR); Youngjune Gwon, Seoul (KR); Seongho Joe, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 257 days.

(21) Appl. No.: 17/975,033

(22) Filed: Oct. 27, 2022

(65) Prior Publication Data
US 2023/0140017 A1 May 4, 2023

(30) Foreign Application Priority Data

Oct. 29, 2021 (KR) .................. 10-2021-0146965

(51) Int. Cl.
*G06F 40/177* (2020.01)
*G06F 16/583* (2019.01)
*G06V 30/412* (2022.01)

(52) U.S. Cl.
CPC .......... *G06F 40/177* (2020.01); *G06F 16/583* (2019.01); *G06V 30/412* (2022.01)

(58) Field of Classification Search
CPC .... G06F 40/177; G06F 16/583; G06V 30/412
See application file for complete search history.

(56) References Cited

U.S. PATENT DOCUMENTS

| 6,628,832 | B2 * | 9/2003 | Kanatsu | G06V 30/412 |
| | | | | 382/175 |
| 6,678,865 | B1 * | 1/2004 | Pratley | G06F 40/177 |
| | | | | 715/227 |
| 11,200,413 | B2 * | 12/2021 | Burdick | G06F 40/284 |
| 2008/0040655 | A1 * | 2/2008 | Tanaka | G06V 30/412 |
| | | | | 382/175 |

(Continued)

FOREIGN PATENT DOCUMENTS

KR 10-0707943 B1 4/2007

OTHER PUBLICATIONS

Kapil Mehrotra, Automatic table detection and retention from scanned document images via analysis of structural information, Dec. 2017 (Year: 2017).*

*Primary Examiner* — Stephen S Hong
*Assistant Examiner* — Carl E Barnes, Jr.
(74) *Attorney, Agent, or Firm* — Sughrue Mion, PLLC

(57) ABSTRACT

The present disclosure relates to a method, an apparatus, a system, and a computer program for correcting table coordinate information. The present disclosure discloses a method for correcting table coordinate information performed by one or more processors in an apparatus, which may include: producing a list of first coordinate elements for a first axis or second coordinate elements for a second axis on the basis of coordinate information of a plurality of cells included in a table of a document image; performing grouping on the list of first coordinate elements or the list of second coordinate elements; and correcting the coordinate information of the cells of the table on the basis of the first coordinate elements or the second coordinate elements on which the grouping was performed.

20 Claims, 14 Drawing Sheets

(56) References Cited

U.S. PATENT DOCUMENTS

| | | | |
|---|---|---|---|
| 2011/0064305 A1* | 3/2011 | Ueno | G06V 30/412 |
| | | | 382/165 |
| 2012/0260152 A1* | 10/2012 | Shimizu | G06F 3/04883 |
| | | | 715/217 |
| 2017/0147552 A1* | 5/2017 | Carroll | G06V 10/44 |
| 2019/0340240 A1* | 11/2019 | Duta | G06V 30/15 |

* cited by examiner

FIG. 1

| ①ISSUE NUMBER | | CONFIRMATION OF FINANCIAL STATEMENTS | | | ⑩PROCESSING PERIOD |
|---|---|---|---|---|---|
| | | | | | IMMEDIATELY |
| T A X P A Y E R | ②ADDRESS OR RESIDENCE (LOCATION OF HEAD OFFICE FOR CORPORATION) | GYEONGNAM | | | |
| | ③BUSINESS LOCATION | | ④PHONE NUMBER | (010) | |
| | ④BUSINESS NAME (CORPORATION NAME) | | ⑤COMPANY REGISTRATION NUMBER | | |
| | ⑥NAME (REPRESENTATIVE) | | ⑦RESIDENT (CORPORATE) REGISTRATION NUMBER | | |
| | ⑧TYPE OF BUSINESS | CATEGORY OF BUSINESS | ⑨ITEM | | PAINTS, SPORTS EQUIPMENT, AND OTHERS |
| | ⑩PURPOSE | FOR SUBMISSION | ⑪QUANTITY | | - |

```
1  GROUP INDEX = 0
2  GROUP MIDPOINT COORDINATES = 0
3  FOR (COORD: COORDS)
4    IF COORD <= (GROUP MIDPOINT COORDINATES + AVERAGE FONT SIZE)
5      MAPPING GROUP INDEX TO CURRENT COORD
6      UPDATE GROUP MIDPOINT COORDINATES INCLUDING CURRENT COORD
7    ELSE:
8      GROUP INDEX += 1
9      GROUP MIDPOINT COORDINATES = COORD
```

| | A | B | C | D | E | F | G | H | I | J | K | L | M | N | O |
|---|---|---|---|---|---|---|---|---|---|---|---|---|---|---|---|
| 1 | | | | | | | | | | | | | | | |
| 2 | | | | | | CONFIRMATION OF FINANCIAL STATEMENTS | | | | | | | | PROCESSING PERIOD | |
| 3 | | ISSUE NUMBER | | | | | | | | | | | | | |
| 4 | | | | | | | | | | | | | | | |
| 5 | | | | | | | | | | | | | | IMMEDIATELY | |
| 6 | | | | | | | | | | | | | | | |
| 7 | | | | | | | | | | | | | | | |
| 8 | | | | | | | | | | | | | | | |
| 9 | | | | | | | | | GYEONGNAM | | | | | | |
| 10 | | | | ①ADDRESS OR RESIDENCE (LOCATION OF HEAD OFFICE FOR CORPORATION) | | | | | | | | | | | |
| 11 | TAXPAYER | | | | | | | | | | | | | | |
| 12 | | | | | | | | | | | | | | (010) | |
| 13 | | | | | | | | | | | | | | | |
| 14 | | | | ②BUSINESS LOCATION | | | | | | | | | | | |
| 15 | | | | | | | | | | | | | ③PHONE NUMBER | | |
| 16 | | | | | | | | | | | | | | | |
| 17 | | | | | | | | | | | | | | | |
| 18 | | | | | | | | | | | | | | | |
| 19 | | | | | | | | | | | | | | | |
| 20 | | | | ④BUSINESS NAME (CORPORATION NAME) | | | | | | | | | ⑤COMPANY REGISTRATION NUMBER | | |
| 21 | | | | | | | | | | | | | | | |
| 22 | | | | | | | | | | | | | | | |
| 23 | | | | | | | | | | | | | | | |
| 24 | | | | ⑥NAME (REPRESENTATIVE) | | | | | | | | | ⑦RESIDENT (CORPORATE) REGISTRATION NUMBER | | |
| 25 | | | | | | | | | | | | | | | |
| 26 | | | | | | | | | | | | | | | |
| 27 | | | | | | | | | | | | | | | |
| 28 | | | | | | | | | | | | | | | |
| 29 | | | | | | | | | | | | | | | |
| 30 | | | | | | | | | | | | | | | |
| 31 | | | | | | | | | | | | | ⑨ITEM | PANTS, SPORTS EQUIPMENT, AND OTHERS | |
| 32 | | ⑧TYPE OF BUSINESS | | | | | | | | | | | | | |
| 33 | | | | | | | | | | | | | | | |
| 34 | | | | | | | | | | | ⑩QUANTITY | | | 1 | |
| 35 | | ⑪PURPOSE | | | | | | | FOR SUBMISSION | | | | | | |
| 36 | | | | | | | | | | | | | | | |

FIG. 12

|   | A | B | C | D | E | F | G |
|---|---|---|---|---|---|---|---|
| 1 |   | ISSUE NUMBER | CONFIRMATION OF FINANCIAL STATEMENTS | | | | ROCESSING PERIOD |
| 2 |   |   |   |   |   |   | IMMEDIATELY |
| 3 | TAXPAYER | ①ADDRESS OR RESIDENCE (LOCATION OF HEAD OFFICE FOR CORPORATION) | GYEONGNAM | | | | |
| 4 |   | ②BUSINESS LOCATION |   |   |   | ③PHONE NUMBER | 010) |
| 5 |   | ④BUSINESS NAME (CORPORATION NAME) |   |   |   | ⑤COMPANY REGISTRATION NUMBER | |
| 6 |   | ⑥NAME (REPRESENTATIVE) |   |   |   | ⑦RESIDENT (CORPORATE) REGISTRATION NUMBER | |
| 7 |   | ⑧TYPE OF BUSINESS | CATEGORY OF BUSINESS | WHOLESALE AND MERCHANDISING | | ⑨ITEM | PAINTS, SPORTS EQUIPMENT, AND OTHERS |
| 8 |   | ⑩PURPOSE | FOR SUBMISSION | | | ⑪QUANTITY | 1 |

METHOD, APPARATUS, SYSTEM, AND COMPUTER PROGRAM FOR CORRECTING TABLE COORDINATE INFORMATION

CROSS-REFERENCE TO RELATED APPLICATION(S)

This application is based on and claims priority under 35 U.S.C. 119 to Korean Patent Application No. 10-2021-0146965, filed on Oct. 29, 2021, in the Korean Intellectual Property Office, the disclosure of which is herein incorporated by reference in its entirety.

BACKGROUND OF THE INVENTION

1. Field of the Invention

The present disclosure relates to a method, an apparatus, a system, and a computer program for correcting table coordinate information and, more specifically, relates to a method, an apparatus, a system, and a computer program for correcting table coordinate information, which are capable of effectively correcting errors in the table coordinate information, which may occur in a document recognition process, by processing coordinate information of a table extracted from an image of an input document including the table.

2. Description of the Prior Art

Recently, technology for digitizing documents in the form of printed paper, and storing and managing the same using optical character recognition (OCR) has been widely used.

However, in the prior art, when a document including a table such as an Excel document is recognized, coordinate information of several cells included in the table frequently failed to be accurately calculated, thereby causing incorrect recognition of the table form.

For example, when recognizing a document including a table as illustrated in FIG. 1, loss of some data, image distortion in a scanner, noise, etc. may occur in the process of recognizing the table, which may cause errors in the table form.

More specifically, as shown in FIG. 2, although cells of a table may be extracted by recognizing lines from the image of a document including the table using conventional machine learning techniques such as image processing, deep learning, or the like, since the above conventional techniques generally calculate and process image patterns on the basis of probability, errors caused by the problems with data loss and the like may be widely propagated. Therefore, as illustrated in FIG. 3, errors may occur in coordinate information of cells in the table so that the cells of the table fail to be uniformly extracted.

For this reason, in the conventional table recognition process, the structure of the table may be inaccurately calculated, and furthermore, an error may be reflected in an electronic document such as an Excel document produced using the calculated table.

SUMMARY OF THE INVENTION

The present disclosure has been made to solve the problems of the prior art described above, and is to provide a method, an apparatus, a system, and a computer program for correcting table coordinate information, which are capable of effectively correcting errors that may occur in a document recognition process by processing table coordinate information extracted from an image of an input document including a table.

Further, the present disclosure is to provide a method, an apparatus, a system, and a computer program for correcting table coordinate information, which are capable of effectively processing table coordinate information while minimizing computational resources required to correct errors.

Furthermore, the present disclosure is to provide a method, an apparatus, a system, and a computer program for correcting table coordinate information, which are capable of preventing errors in electronic documents such as Excel documents produced using a table structure that is inaccurately calculated.

In order to solve the above problems, a method for correcting table coordinate information according to one aspect of the present disclosure may be performed by one or more processors in an apparatus and may include: producing a list of first coordinate elements for a first axis or second coordinate elements for a second axis on the basis of coordinate information of a plurality of cells included in a table of a document image; performing grouping on the list of first coordinate elements or the list of second coordinate elements; and correcting the coordinate information of the cells of the table on the basis of the first coordinate elements or the second coordinate elements on which the grouping was performed.

Here, the producing of the lists may include producing each of the lists of first coordinate elements and second coordinate elements on the basis of coordinate information of one or more of respective vertices of the plurality of cells included in the table.

The producing of the lists may include producing each of the lists of first coordinate elements and second coordinate elements on the basis of coordinate information of upper left vertices and lower right vertices of the plurality of cells included in the table.

In addition, the producing of the lists may include producing each of the lists of first coordinate elements and second coordinate elements on the basis of coordinate information of one vertex at a predetermined position among the vertices of the plurality of cells included in the table.

In addition, the producing of the lists may include producing each of the lists by sorting the first coordinate elements and the second coordinate elements according to sizes thereof.

The performing of the grouping may include sequentially performing grouping on each sorted list in order of size of the coordinate element.

In addition, the performing of the grouping may include performing grouping in consideration of the sizes of characters included in the table.

Furthermore, the performing of the grouping may include, if the size of the coordinate element on which the grouping is sequentially performed falls within a range obtained by adding and subtracting an average value of sizes of the characters to and from a representative value of a current group, including the coordinate element in the current group, and if the size of the coordinate element falls outside of the range, producing a new group and including the coordinate element in the new group.

In addition, the correcting of the coordinate information may include correcting the coordinate information of the cells of the table on the basis of a representative value of each of the groups of first coordinate elements and second coordinate elements on which the grouping was performed.

In addition, the correcting of the coordinate information may include correcting the coordinate information of indices in the first axis and second axis directions in the table on the basis of a representative value of each of the groups of first coordinate elements and second coordinate elements on which the grouping was performed.

In addition, according to another aspect of the present disclosure, there is provided a computer-readable storage medium storing instructions configured to cause, when executed by a processor, an apparatus including the processor to implement an operation of correcting table coordinate information, and the operation may include: producing a list of first coordinate elements for a first axis or second coordinate elements for a second axis on the basis of coordinate information of a plurality of cells included in a table of a document image; performing grouping on the list of first coordinate elements or the list of second coordinate elements; and correcting the coordinate information of the cells of the table on the basis of the first coordinate elements or the second coordinate elements on which the grouping was performed.

In addition, a table coordinate information correction apparatus according to another aspect of the present disclosure may include a processor, and the processor may be configured to: produce a list of first coordinate elements for a first axis or second coordinate elements for a second axis on the basis of coordinate information of a plurality of cells included in a table of a document image; perform grouping on the list of first coordinate elements or the list of second coordinate elements; and correct the coordinate information of the cells of the table on the basis of the first coordinate elements or the second coordinate elements on which the grouping was performed.

Here, in producing the lists, each of the lists of first coordinate elements and second coordinate elements may be produced on the basis of coordinate information of one or more of respective vertices of the plurality of cells included in the table.

In addition, in producing the lists, each of the lists of first coordinate elements and second coordinate elements may be produced on the basis of coordinate information of one vertex at a predetermined position among the vertices of the plurality of cells included in the table.

In addition, in producing the lists, each of the lists may be produced by sorting the first coordinate elements and the second coordinate elements according to sizes thereof.

In performing the grouping, the grouping may be sequentially performed on each sorted list in order of size of each coordinate element.

In addition, in performing the grouping, the grouping may be performed in consideration of the sizes of characters included in the table.

Furthermore, in performing the grouping, if the size of the coordinate element on which the grouping is sequentially performed falls within a range obtained by adding and subtracting an average value of sizes of the characters to and from a representative value of a current group, the coordinate element may be included in the current group, and if the size of the coordinate element falls outside of the range, a new group may be produced and the coordinate element may be included in the new group.

In addition, in correcting the coordinate information, the coordinate information of the cells of the table may be corrected on the basis of a representative value of each of the groups of first coordinate elements and second coordinate elements on which the grouping was performed.

In addition, in correcting the coordinate information, the coordinate information of indices in the first axis and second axis directions in the table may be corrected on the basis of a representative value of each of the groups of first coordinate elements and second coordinate elements on which the grouping was performed.

In a method, an apparatus, a system, and a computer program for correcting table coordinate information according to an embodiment of the present disclosure, it is possible to effectively correct errors that may occur in a document recognition process by processing table coordinate information extracted from an image of an input document including a table.

In addition, in a method, an apparatus, a system, and a computer program for correcting table coordinate information according to an embodiment of the present disclosure, it is possible to effectively process table coordinate information while minimizing computational resources required to correct errors.

Furthermore, in a method, an apparatus, a system, and a computer program for correcting table coordinate information, it is possible to prevent errors in electronic documents such as Excel documents produced using a table structure that is inaccurately calculated.

BRIEF DESCRIPTION OF THE DRAWINGS

The above and other aspects, features, and advantages of the present disclosure will be more apparent from the following detailed description taken in conjunction with the accompanying drawings, in which:

FIGS. 1 to 3 illustrate a table structure recognition error in the optical document recognition technique according to the prior art;

FIGS. 8, 9A and 9B are diagrams illustrating a grouping algorithm in a method for correcting table coordinate information according to an embodiment of the present disclosure;

FIGS. 11 to 12 are diagrams illustrating correction of errors by a method for correcting table coordinate information according to an embodiment of the present disclosure;

DETAILED DESCRIPTION OF THE EXEMPLARY EMBODIMENTS

Figure 2:
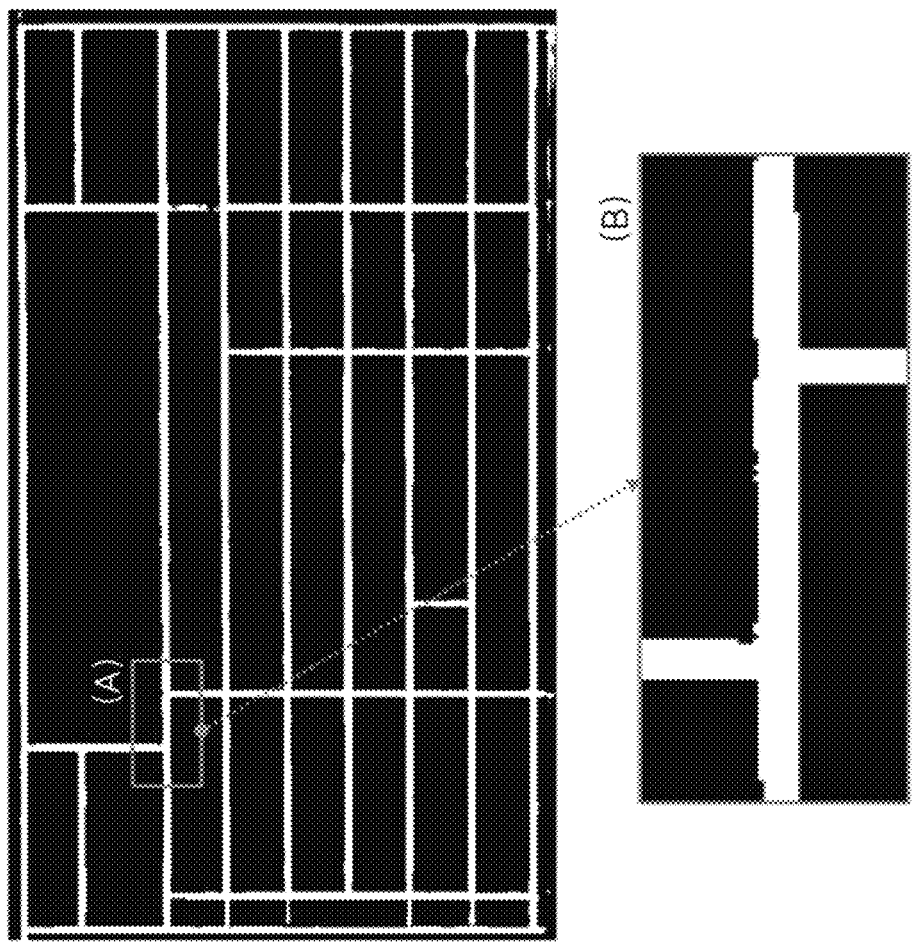

The present disclosure will be further clarified by the preferred embodiments below.

Prior to description of the disclosure, terms or words used in the present specification and claims are appropriately defined by the inventor in order to explain the disclosure in the best way, and should be construed as meanings and concepts consistent with the technical spirit of the present disclosure and to merely describe the embodiments, instead of limiting the present disclosure.

In assigning reference numerals to the elements, the same or similar elements are given the same reference numerals, regardless of the reference numerals, and a redundant description thereof will be omitted. Terms "module" and "unit" of the elements used in the following description will be given or used interchangeably in consideration of the ease of writing the specification, and do not have meanings or roles distinct from each other by themselves, and may indicate software or hardware elements.

In describing the elements of the present disclosure, when an element is expressed in a singular form, it should be understood that the element also includes a plural form unless otherwise specified. In addition, terms such as "first", "second", etc. will be used to distinguish one element from other elements, and the element is not limited by the terms. In addition, in the case where one element is connected to the other element, this indicates that another element may be connected between the one element and the other element.

In addition, in describing the embodiments disclosed in the present specification, if it is determined that detailed descriptions of related known technologies may obscure the gist of the embodiments disclosed in the present specification, the detailed descriptions will be omitted. In addition, the accompanying drawings are provided only for easy understanding of the embodiments disclosed in the present specification, and the technical spirit disclosed herein is not limited by the accompanying drawings, and it should be understood that all changes, equivalents, or substitutes thereof are included in the spirit and scope of the present disclosure.

Hereinafter, exemplary embodiments of a method, an apparatus, a system, and a computer program for correcting table coordinate information according to the present disclosure will be described in detail with reference to the accompanying drawings.

Figure 4:
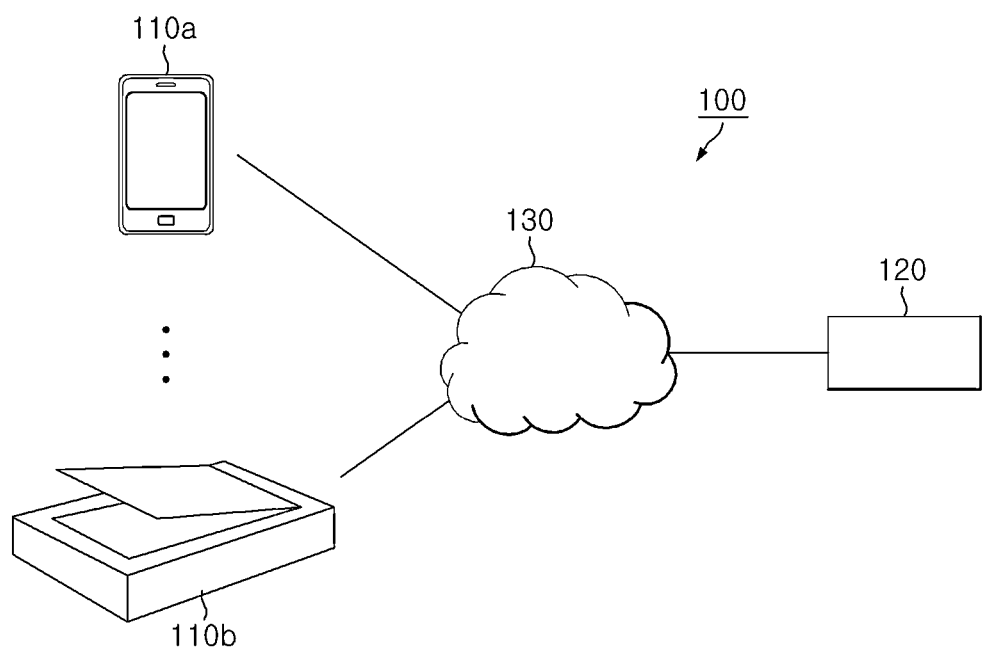
FIG. 4 is a diagram illustrating the configuration of a table coordinate information correction system according to an embodiment of the present disclosure.

FIG. 4 is a diagram illustrating the configuration of a table coordinate information correction system 100 according to an embodiment of the present disclosure. As shown in FIG. 4, a table coordinate information correction system 100 according to an embodiment of the present disclosure may be configured to include one or more optical document input apparatuses 110 for producing a document image by photographing or scanning a printed document, and a table coordinate information correction apparatus 120 for processing table coordinate information included in the document image, thereby correcting errors in table coordinate information, which may occur in a document recognition process.

In this case, as the optical document input apparatuses 110, portable terminals equipped with a camera capable of photographing documents, such as a smartphone, a tablet PC, a PDA, a mobile phone, and the like, may be used, and a scanner capable of scanning the document may be used, but the present disclosure is not necessarily limited thereto. In addition, various devices capable of producing a document image by photographing or scanning a printed document may be used.

In addition, although FIG. 4 illustrates that the optical document input apparatus 110 is included in the table coordinate information correction system 100 according to an embodiment of the present disclosure, the present disclosure is not necessarily limited thereto, and the table coordinate information correction system 100 according to an embodiment of the present disclosure may receive and process a document image previously produced in the optical document input apparatus 110, and furthermore, may receive and process coordinate information of a plurality of cells included in a table of the document image that is previously produced.

In this case, the table coordinate information correction apparatus 120 may be implemented using one or more servers, but the present disclosure is not necessarily limited thereto. In addition, the table coordinate information correction apparatus 120 may be implemented as a dedicated device or may be implemented using various devices capable of processing information, such as a cloud system in which a plurality of information processing devices interworks or the like.

In addition, a communication network 130 connecting the optical document input apparatus 110 and the table coordinate information correction apparatus 120 in FIG. 4 may include a wired network and a wireless network, and specifically, may include various communication networks such as a local area network (LAN), a metropolitan area network (MAN), a wide area network (WAN), and the like. In addition, the network 130 may also include the well-known world wide web (WWW). However, the communication network 130 according to the present disclosure is not limited to the above-listed networks, and may include at least a part of a well-known wireless data network, a well-known telephone network, or a well-known wired/wireless television network.

However, in the present disclosure, the table coordinate information correction apparatus 120 does not necessarily receive predetermined input information from the optical document input apparatus 110 through the communication network 130, and may receive input information directly without passing through the communication network 130, and furthermore, may be implemented in various forms such as the case where the table coordinate information correction apparatus 120 is integrally formed with the optical document input apparatus 110.

Figure 5:
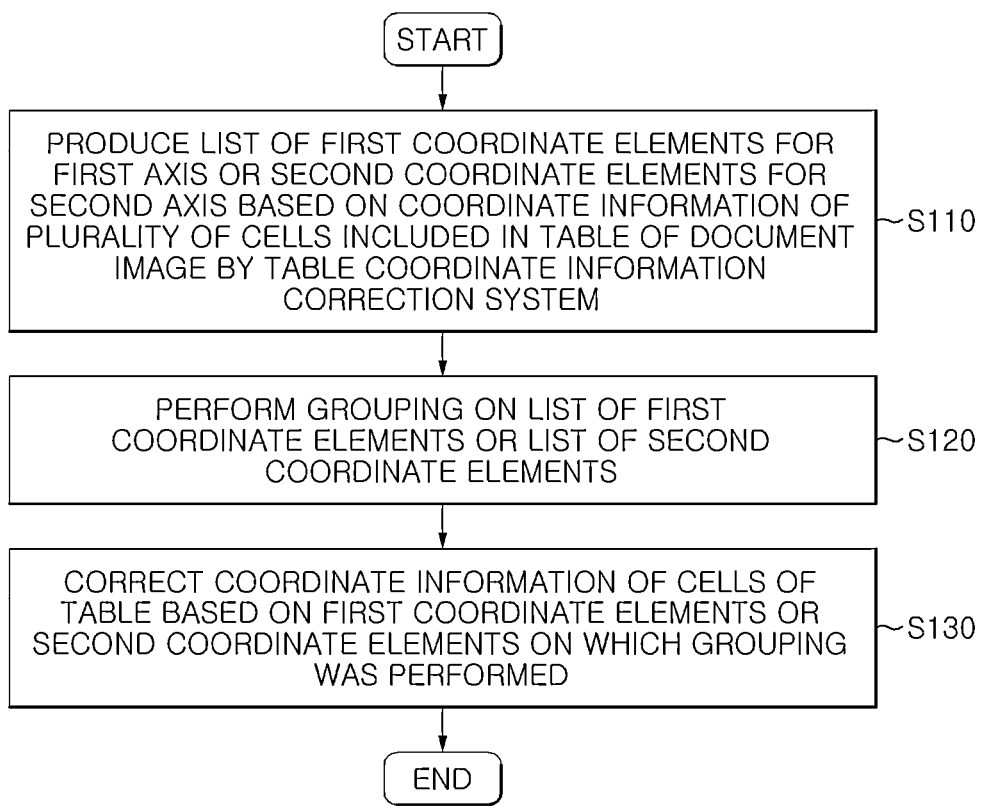
FIG. 5 is a flowchart illustrating a method for correcting table coordinate information according to an embodiment of the present disclosure.

FIG. 5 is a flowchart illustrating a method for correcting table coordinate information according to an embodiment of the present disclosure. As shown in FIG. 5, a table coordinate information correction method according to an embodiment of the present disclosure may be performed by one or more processors in the apparatus and include producing a list of first coordinate elements for a first axis or second coordinate elements for a second axis on the basis of coordinate information of a plurality of cells included in a table of a document image (S110), performing grouping on the list of first coordinate elements or the list of second coordinate elements (S120), and correcting the coordinate information of the cells of the table on the basis of the first coordinate elements or second coordinate elements on which the grouping was performed (S130).

The method shown in FIG. 5 may be performed, for example, by the table coordinate information correction apparatus 120, and furthermore, the table coordinate information correction apparatus 120 be implemented by including a computing device described later with reference to FIG. 14. For example, the table coordinate information correction apparatus 120 may include a processor 10, and the processor 10 may execute an instruction configured to implement an operation of correcting table coordinate information, thereby correcting the table coordinate information.

Hereinafter, a method for correcting table coordinate information according to an embodiment of the present disclosure will be described for each step in detail with reference to FIG. 5.

First, in producing a list (S110), the table coordinate information correction system 100 produces a list of first coordinate elements for a first axis or second coordinate elements for a second axis on the basis of coordinate information of a plurality of cells included in a table of a document image. This may include a case of producing all lists of first coordinate elements for the first axis or second coordinate elements for the second axis.

Figure 3:
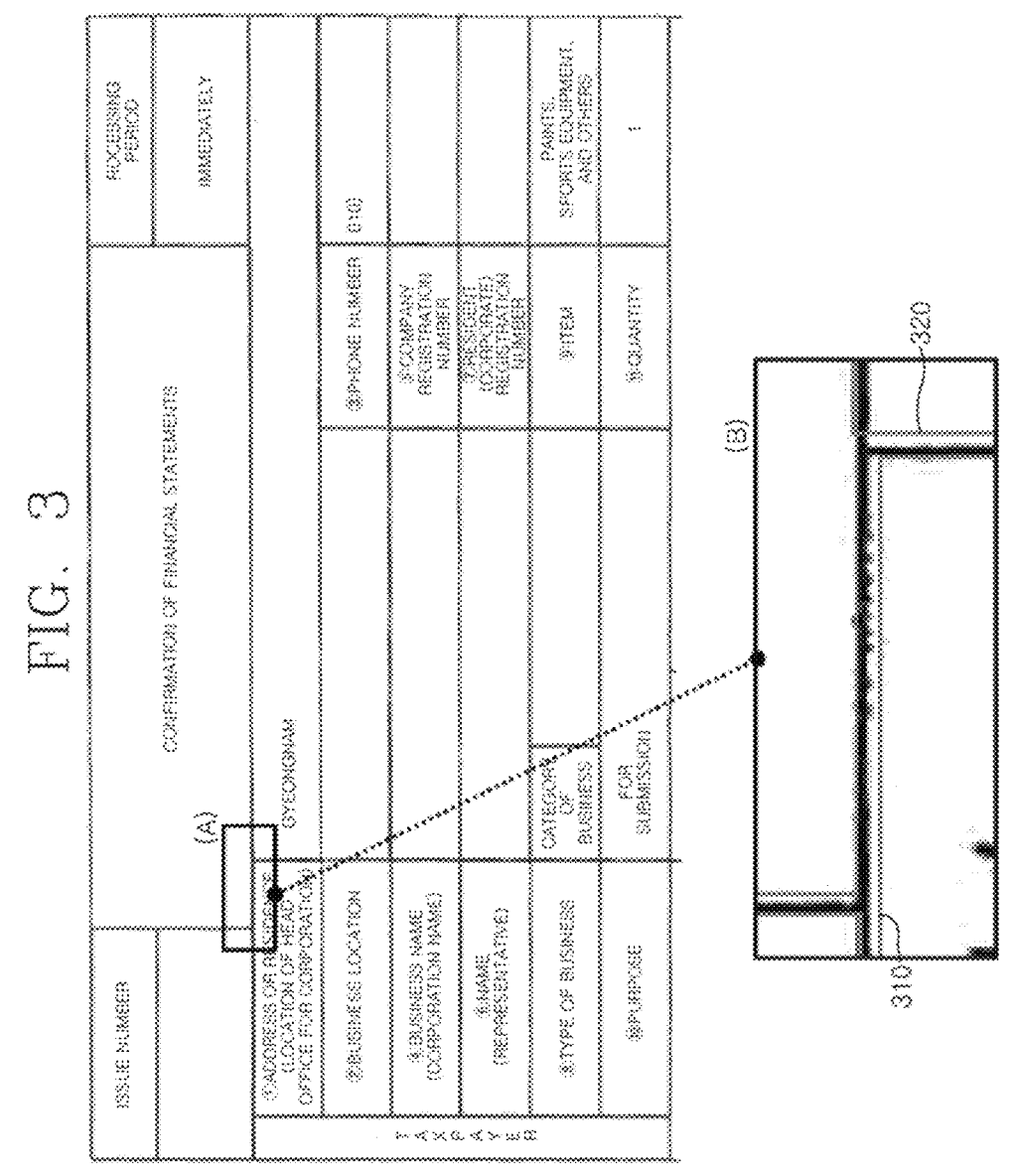

More specifically, referring to FIG. 3, a table of a document image may include a plurality of cells.

In this case, coordinate information of the cell may be configured to include first coordinate elements for a first axis and second coordinate elements for a second axis.

As a more specific example, the first axis may be a horizontal axis (x-axis) and the second axis may be a vertical axis (y-axis), and thus the coordinate information (e.g., (x1, y1)) of the cell may be configured to include coordinate information (x1) for the horizontal axis (x-axis) and coordinate information (y1) for the vertical axis (y-axis). However, in the present disclosure, the first axis and the second axis do not necessarily have to be the horizontal axis (x-axis) and the vertical axis (y-axis), and the first axis and the second axis may be various coordinate axes capable of representing a two-dimensional plane, such as, polar coordinates, as well as the coordinate axes perpendicular to each other.

Furthermore, since the cell has a rectangular region, coordinate information of the cell may be configured to include coordinate information of an upper left vertex and a lower right vertex of the cell.

However, the present disclosure is not necessarily limited thereto, and the coordinate information of the cell may be configured to include coordinate information of an upper right vertex and a left lower vertex of the cell, or the coordinate information of the cell may be configured to include coordinate information of one or more of the vertices.

To this end, the coordinate information of the cell may be calculated by applying a cell extraction technique to the table of the input document image.

As a more specific example, coordinate information of a plurality of cells included in the table may be calculated from the document image using a deep learning model previously used in the field of image segmentation technology, but the present disclosure is not necessarily limited thereto.

Accordingly, in the method for correcting table coordinate information according to an embodiment of the present disclosure, each list of the first coordinate elements for the first axis and the second coordinate elements for the second axis is produced on the basis of the coordinate information of a plurality of cells included in the table of the document image.

For example, if (x1, y1), (x2, y2), ..., and (xN, yN) are calculated as coordinate information of a plurality of cells included in the table of the document image, a list of first coordinate elements (e.g., "x1, x2, ..., and xN") for the first axis (e.g., the horizontal axis (x-axis)) and a list of second coordinate elements (e.g., "y1, y2, ..., yN") for the second axis (e.g., the vertical axis (y-axis)) may be produced from the calculated coordinate information.

Figure 6:
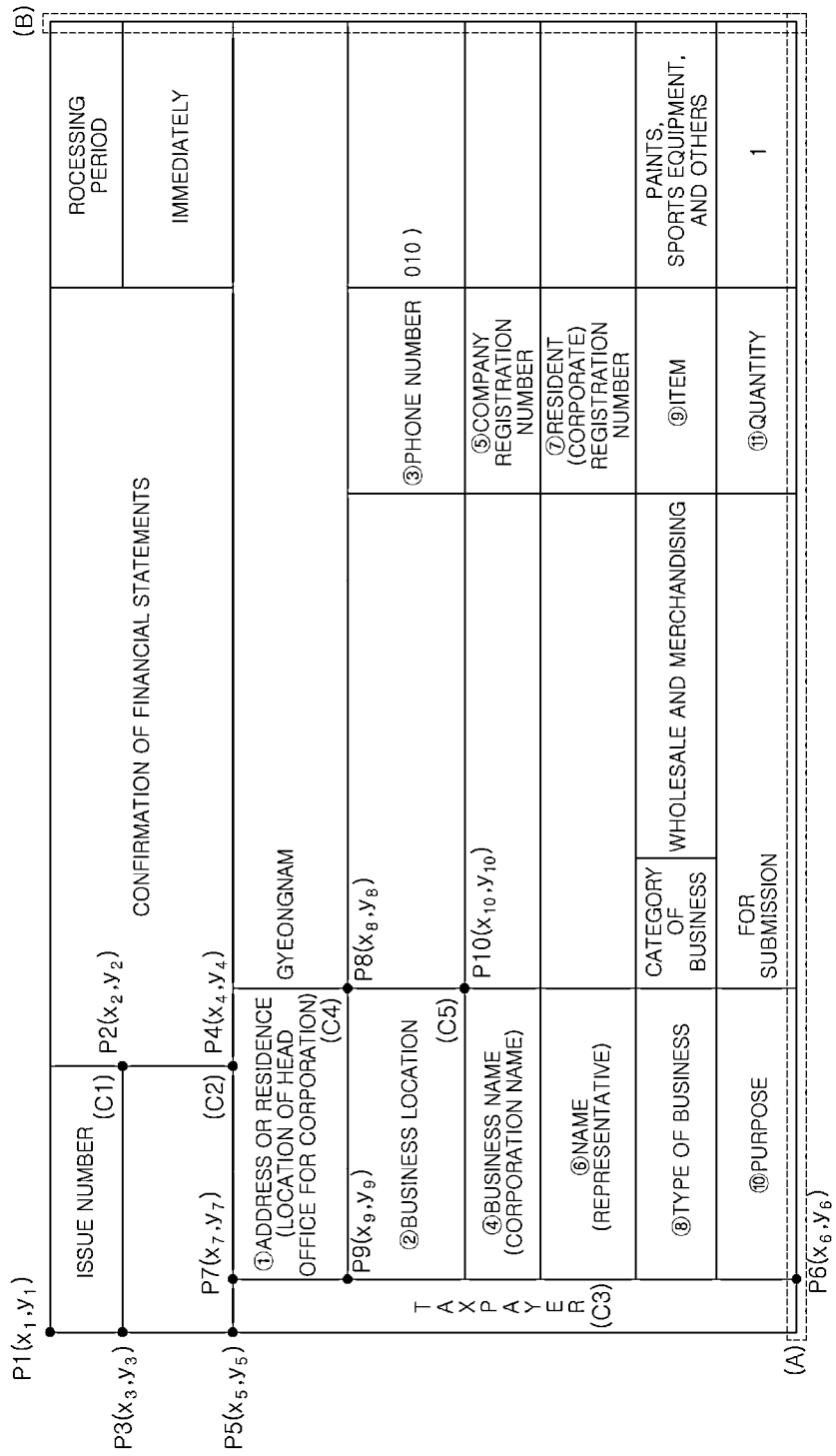
FIGS. 6 to 7 are diagrams illustrating a specific embodiment of a method for correcting table coordinate information according to an embodiment of the present disclosure.

As a more specific example, FIG. 6 illustrates coordinate information of some cells (C1 to C5 in FIG. 6) of a document image in a method for correcting table coordinate information according to an embodiment of the present disclosure.

In this case, in a method for correcting table coordinate information according to an embodiment of the present disclosure, a list of first coordinate elements (x1, x2, x3, x4, x5, x6, ..., x10, and the like in FIG. 6) for the first axis and a list of second coordinate elements (y1, y2, y3, y4, y5, y6, ..., y10, and the like in FIG. 6) for the second axis may be produced from coordinate information of respective cells of the document image.

Furthermore, in the method for correcting table coordinate information according to an embodiment of the present disclosure, each list of first coordinate elements and second coordinate elements may be produced based on coordinate information of one vertex at a predetermined position among the vertices of a plurality of cells included in the table.

For example, a list of first coordinate elements (x1, x3, x5, ..., x9, and the like in FIG. 6) and a list of second coordinate elements (y1, y3, y5, ..., y9, and the like in FIG. 6) for the second axis may be produced from coordinate information of the upper left vertex in FIG. 6.

In this case, using only the coordinate information of one vertex at a specific position, as described above, may have an advantage of reducing the computational resources required for grouping or the like.

However, in the case of using only the coordinate information of one vertex at a specific position as described above, the coordinate information of the vertex in the opposite direction of the used vertex is omitted, which makes it difficult to perform correction using coordinate information of the cell located in the last column or row.

As a more specific example, when using only coordinate information of the upper left vertices in FIG. 6 (e.g., P1, P3, P5, and the like in FIG. 6), coordinate information of the lower right vertices (e.g., P2, P4, P6, and the like in FIG. 6) becomes unavailable, and as a result, it is difficult to correct the lower edge (e.g., "A" in FIG. 6) and the right edge (e.g., "B" in FIG. 6) of the table in FIG. 6.

Therefore, in the case where only the coordinate information of one vertex at a specific position is used as described above, an additional processing process may be required to correct the edge in a specific direction.

For example, in order to correct the lower edge and the right edge in FIG. 6, it is possible to perform a method of further collecting coordinate information of the lower right vertices for the cells located in the lower edge and right edge and including the same in the lists of first coordinate elements and second coordinate elements or processing the same separately.

Referring back to step S110, if the cells included in the table are positioned in the same row, coordinate information of the vertical axis (y-axis) of the same vertices (e.g., the same upper left vertices) must be the same, and if the cells are positioned in the same column, coordinate information of the horizontal axis (x-axis) must be the same. However, an error may occur in the process of recognizing the respective cells included in the table, which may cause a deviation in the coordinate information between the cells positioned in the same row or the same column.

As a more specific example, as shown in FIG. 3B, there may be a deviation between coordinate information calculated from a first cell 310 and coordinate information calculated from a second cell 320, which are positioned in the same row. Accordingly, such a difference in the coordinate information may lead to misrecognition of the shape of the table or an error in the structure of the table that is calculated even though the cells are positioned in the same row.

In this regard, according to the method for correcting table coordinate information according to an embodiment of the present disclosure, errors in the table coordinate information, which may occur in the process of recognizing a document, may be corrected by processing the table coordinate information extracted from an input document image, thereby effectively preventing errors caused by misrecognition of the form or structure of the table and further preventing errors in electronic documents such as Excel documents produced using the calculated table structure.

Subsequently, in performing grouping (S120), grouping may be performed on the list of first coordinate elements or the list of second coordinate elements. This may include performing grouping on the list of first coordinate elements and the list of second coordinate elements, respectively.

Performing grouping on the list of coordinate elements in the performing grouping (S120) may include dividing the coordinate elements located within a certain range, among the respective coordinate elements included in the list, into respective groups according to a predetermined criterion.

Figure 7:
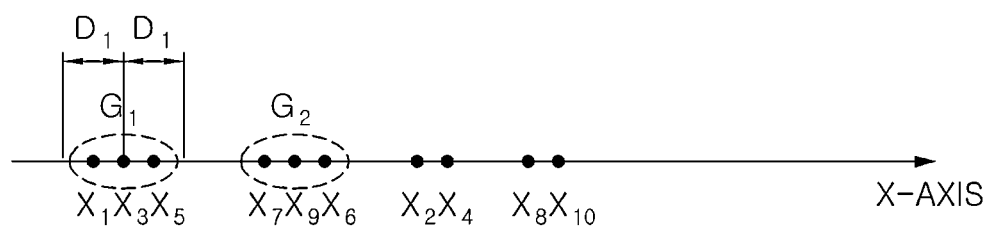

More specifically, as shown in FIG. 7, a plurality of groups (e.g., G1, G2, and the like in FIG. 7) may be produced by performing grouping on the list of first coordinate elements produced with respect to the horizontal axis (x-axis), and similarly, a plurality of groups may be produced by performing grouping on the list of second coordinate elements produced with respect to the vertical axis (y-axis).

In the performing grouping (S120), any algorithm for properly grouping the list of first coordinate elements and the list of second coordinate elements may be applied thereto.

Furthermore, according to the method for correcting table coordinate information according to an embodiment of the present disclosure, the performing grouping (S120) may be conducted after producing the respective lists by sorting the first coordinate elements and the second coordinate elements according to the sizes in the producing of the list (S110), thereby reducing computational resources required for the grouping and efficiently performing grouping on the respective lists.

In this case, in the performing grouping (S120), grouping may be sequentially performed on the each sorted list in the order of size of the coordinate element.

In the performing grouping (S120), the grouping may be performed in consideration of the sizes of the characters included in the table.

More specifically, in the performing grouping (S120), the grouping may be performed on each list in such a way that if the size of the coordinate element on which the grouping is sequentially performed falls within a range obtained by adding and subtracting an average value of the sizes of the characters to and from a representative value of a current group, the coordinate element is included in the current group, and that if the size of the coordinate element falls outside of the above range, a new group is produced and the coordinate element is included in the new group.

As a more specific example, as shown in FIG. 8, in the performing grouping (S120), a group index may be set to 0 (line 1 in FIG. 8) in an initialization process, and group center coordinates may be set to 0 (line 2 in FIG. 8).

Subsequently, grouping is performed on the respective lists ("coords" in FIG. 8) (that is, the list of first coordinate elements and the list of second coordinate elements) while performing an iterative loop on the respective coordinate elements ("coord" in FIG. 8) included in the list (line 3 in FIG. 8).

Accordingly, grouping is performed while the respective coordinate elements sorted according to size (e.g., sorted in ascending order) are sequentially processed.

More specifically, referring to the embodiment in FIG. 7, if the smallest x1 is initially input, x1 constitutes a first group (G1 in FIG. 7) and is configured as a midpoint coordinate of the first group. Subsequently, if x3 and x5 adjacent to x1 are sequentially input, they are included in the first group (G1 in FIG. 7) and update the midpoint coordinate of the first group (line 5 to 6 in FIG. 8).

On the other hand, as shown in FIG. 7, since x7 input subsequent thereto has a difference from the first group (G1 in FIG. 7), a new second group (G2 in FIG. 7) is produced.

A process of producing a new group described above will be described in more detail as follows. If a subsequent coordinate element x7 is input in the state in which the first group (G1 in FIG. 7) is produced in FIG. 7, it may be determined whether or not the input coordinate element falls within a range of a predetermined reference value (e.g., an average value of the sizes of characters included in the table) on the basis of a representative value (the "group midpoint coordinates" in FIG. 8) of the current group (here, G1), thereby determining whether or not to include the input coordinate element in the current group.

As a more specific example, the representative value (the "group midpoint coordinates" in FIG. 8) of the current group G1 is x3, and the predetermined reference value (e.g., an average value of the sizes of characters included in the table) is D1 in FIG. 7, but since x7 falls outside of the range obtained by adding or subtracting D1 to or from x3, a new group G2 is produced, instead of including the same in the current group G1 (lines 7 to 9 in FIG. 8).

Figures 9A, 9B:
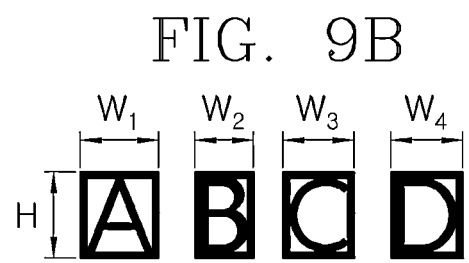

In this case, the average value of sizes of the characters included in the table ("average font size" in FIG. 8) is determined to be, as shown in FIGS. 9A and 9B, the average value of sizes of characters in the horizontal axis direction (e.g., the average value of W1, W2, W3, W4 in FIG. 9B) for the horizontal axis (x-axis) and the value (H in FIG. 9B), as the reference value, corresponding to the sizes of the characters in the vertical axis direction for the vertical axis (y-axis) when the sizes are the same.

In this case, as shown in FIGS. 9A and 9B, the Suzuki85 algorithm may be applied to detect an image outline of the character. Accordingly, the outline of an object may be extracted from a binarized image using the Suzuki85 algorithm, a plurality of objects may be processed by classifying the same according to their proximity, and an average font size may be derived by deriving the character area from the detected outline and using absolute values of the x-coordinate and y-coordinate. However, the present disclosure is not necessarily limited thereto.

In addition, although it has been described in FIG. 8 that the coordinate element is determined whether or not to be included in the current group on the basis of the group midpoint coordinates and the average font size, the present disclosure is not necessarily limited thereto, and it is also possible to determine whether to include the coordinate element in the current group using values other than the group midpoint coordinates or average font size.

As described above, in the method for correcting table coordinate information according to an embodiment of the present disclosure, the coordinate elements of each list may be pre-sorted in order of size (e.g., in ascending order) and then sequentially input according to the sizes thereof, thereby performing grouping on each list. Accordingly, even if the number of coordinate elements included in each list increases, the time and computational resources required for grouping increase by the first order (o(n)), so that grouping may be performed more efficiently.

Next, in the correcting coordinate information (S130), coordinate information of the cells in the table is corrected on the basis of the first coordinate elements or the second coordinate elements on which the grouping was performed. This may include correcting coordinate information of the cells in the table by reflecting both the first coordinate elements and the second coordinate elements on which the grouping was performed.

In this case, correcting the coordinate information of the cells in the table in the correcting coordinate information (S130) may indicate replacing the coordinate information of the cells included in the table with a representative value such as an average value of the first coordinate elements or second coordinate elements on which the grouping was performed and matching each other, but the present disclosure is not necessarily limited thereto, and in addition, various methods such as adjusting the cells included in the table to be arranged according to a predetermined rule may be applied.

More specifically, in the correcting coordinate information (S130), the coordinate information of the cells in the table may be corrected on the basis of a representative value of each group of the first coordinate elements and second coordinate elements on which the grouping was performed.

Furthermore, in the correcting coordinate information (S130), coordinate information of indices in the first axis and second axis directions in the table may be corrected on the basis of the representative value of each group of the first coordinate elements and second coordinate elements on which the grouping was performed.

As a more specific example, even if there are some deviations between the coordinate information of the first cell 310 and the coordinate information of the second cell 320 in FIG. 3B, in the method for correcting table coordinate information according to an embodiment of the present disclosure, coordinate information of the first cell 310 in the vertical axis (y-axis) and coordinate information of the second cell 320 in the vertical axis (y-axis) are included in one group, thereby calculating a representative value thereof (e.g., an average value), and based on this, the coordinate information of the first cell 310 and second cell 320 is corrected, so that a deviation in the vertical axis (y-axis) direction, which may occur between the first cell 310 and the second cell 320, is able to be effectively corrected.

Similarly, according to the method for correcting table coordinate information according to an embodiment of the present disclosure, it is also possible to effectively correct a deviation in the horizontal axis (x-axis) direction by performing grouping on the coordinate information in the horizontal axis (x-axis) direction.

As a more specific example, referring to FIGS. 6 and 7, since the first coordinate elements of the lower right vertices of the first cell C1 and the second cell C2 are x2 and x4, respectively, which may form one group, in FIG. 6, an average value ((x2+x4)/2) of x2 and x4 may be calculate in FIG. 7 so that the first coordinate elements x2 and x4 of the lower right vertices of the first cell C1 and the second cell C2 may be corrected by being replaced with the average value ((x2+x4)/2).

Figure 10:
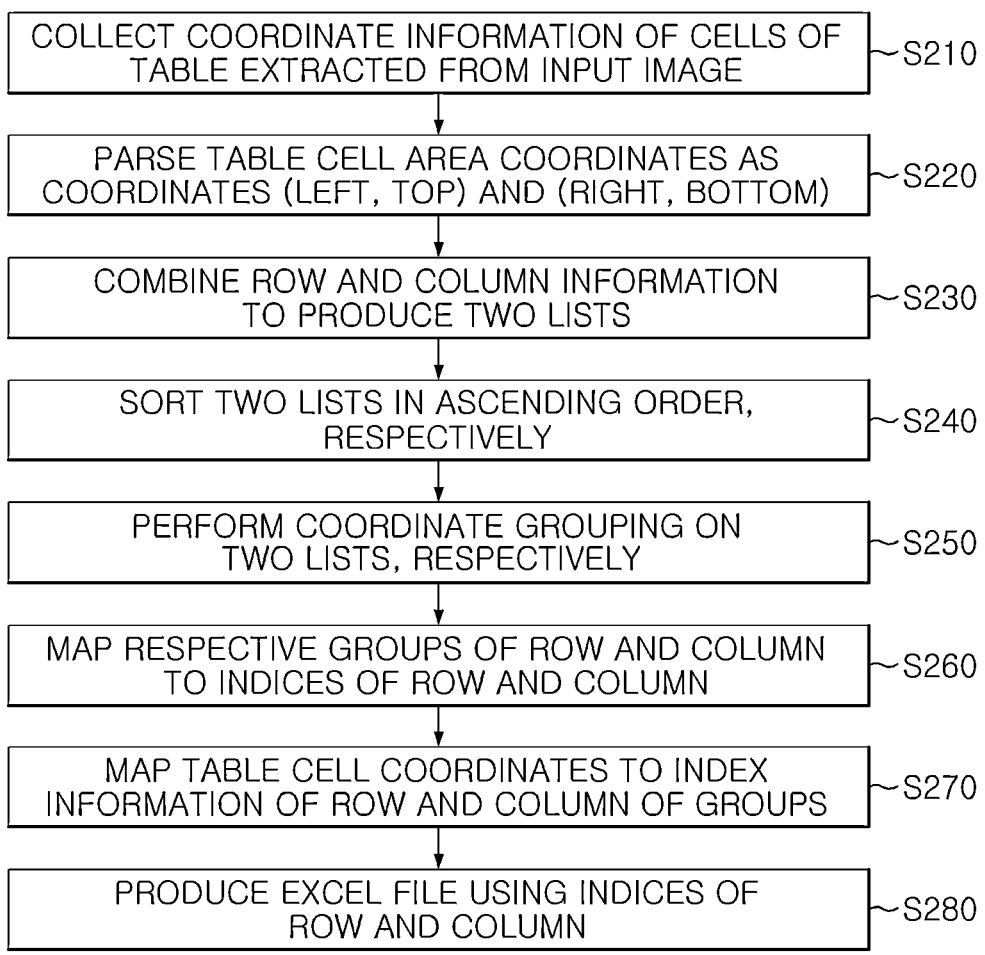
FIG. 10 is a flowchart illustrating a specific embodiment of a method for correcting table coordinate information according to an embodiment of the present disclosure.

FIG. 10 illustrates a specific embodiment of a method for correcting table coordinate information according to an embodiment of the present disclosure.

Hereinafter, a specific embodiment of a method for correcting table coordinate information according to an embodiment will be described in detail with reference to FIG. 10.

As shown in FIG. 10, in step S210, coordinate information of cells of a table extracted from an input document image is collected.

Subsequently, in step S220, coordinates of the top left vertex and the bottom right vertex are parsed and extracted from the coordinate information of the cells of the table.

In addition, in step S230, a first list is configured by combining coordinate elements in a row, that is, in the horizontal axis (x-axis), and a second list is configured by combining coordinate elements in a column, that is, in the vertical axis (y-axis).

Next, in step S240, the first list and the second list are sorted according to their sizes (e.g., in ascending order).

Subsequently, in step S250, grouping is performed on the sorted first list and second list, respectively. In this case, the above grouping algorithm described with reference to FIG. 7 may be applied.

Next, in step S260, respective groups calculated from the first list and the second list for the row and column are mapped to indices of the row and column.

As a more specific example, mapping may be performed on indices (A, B, C, etc.) in the row direction and indices (1, 2, 3, etc.) in the column direction, which are used to identify the cells in Excel or the like.

Subsequently, in step S270, coordinate information (e.g., a representative value of each group) of the cells of the table may be mapped to the indices of the row and column, thereby correcting the coordinate information of each cell.

Furthermore, in step S280, an electronic document such as an Excel file or the like may be produced using the indices of the row and column to which the corrected coordinate information is mapped.

In this case, the method shown in FIG. 10 may be performed by, for example, the table coordinate information correction apparatus 120, and furthermore, the table coordinate information correction apparatus 120 may be implemented by including a computing device described later with reference to FIG. 14. For example, the table coordinate information correction apparatus 120 may include a processor 10, and the processor 10 may execute an instruction configured to implement an operation of correcting table coordinate information, thereby correcting the table coordinate information.

Accordingly, in the method for correcting table coordinate information according to an embodiment of the present disclosure, it is possible to effectively correct errors, which may occur in the process of recognizing a document, by processing the table coordinate information extracted from an image of an input document including a table and further prevent errors in electronic documents such as Excel documents produced using a table structure that is incorrectly calculated.

More specifically, in the case of the prior art, an error may occur in the process of recognizing coordinate information of cells of the table, and if a table is produced to match indices of rows and columns using the same as it is, as shown in FIG. 11, the table fails to accurately match the cell structure included in the table.

In this regard, in the method for correcting table coordinate information according to an embodiment of the present disclosure, as shown in FIG. 12, a table may be produced to match the indices of rows and columns by accurately correcting the coordinate information of the table in the input document image, thereby more accurately and efficiently producing a table structure and effectively preventing errors in electronic documents such as Excel documents use the same.

In addition, a computer-readable storage medium according to another aspect of the present disclosure is a computer-readable storage medium that stores instructions configured to cause, when executed by a processor, an apparatus including the processor to implement an operation of correcting table coordinate information, and the operation may include: producing a list of first coordinate elements for a first axis or second coordinate elements for a second axis on the basis of coordinate information of a plurality of cells included in a table of a document image; performing grouping on the list of first coordinate elements or the list of second coordinate elements; and correcting the coordinate information of the cells of the table on the basis of the first coordinate elements or second coordinate elements on which the grouping was performed. In this case, a computer program stored in the storage medium may be a computer program stored in a computer-readable storage medium in order to execute respective operations of the method for correcting table coordinate information described above in the computer. Here, the computer program may be a computer program including high-level language code that may be executed in the computer using an interpreter or the like, as well as a computer program including machine language code produced by a compiler. The computer is not limited to a personal computer (PC) or a notebook computer, and includes all kinds of information processing devices, such as a server, a smartphone, a tablet PC, a PDA, a mobile phone, or the like, including a central processing unit (CPU) and capable of executing a computer program.

In addition, the computer-readable storage medium may permanently store a computer-executable program or temporarily store the same for execution or download. In addition, the medium may be a variety of recording means or storage means in the form of a single or a plurality of hardware combined, and is not limited to a medium directly connected to any computer system, and may exist to be distributed on a network. Accordingly, the detailed description should be construed as exemplary, instead of as restrictive, in all respects. The scope of the present disclosure should be determined by a reasonable interpretation of the appended claims, and all modifications within the equivalent scope of the present disclosure are included in the scope of the present disclosure.

Figure 13:
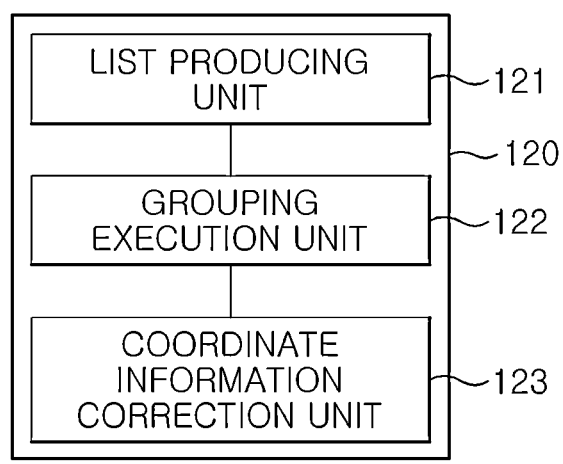
FIG. 13 is a diagram illustrating the configuration of a table coordinate information correction apparatus according to an embodiment of the present disclosure.

FIG. 13 is a diagram illustrating the configuration of a table coordinate information correction apparatus 120 according to an embodiment of the present disclosure.

As shown in FIG. 13, the table coordinate information correction apparatus 120 according to an embodiment of the present disclosure may be configured to include a list producing unit 121, a grouping execution unit 122, and a coordinate information correction unit 123.

In addition, according to an embodiment of the present disclosure, the table coordinate information correction apparatus 120 may be implemented by including a computing device described later with reference to FIG. 14. For example, the processor 14 may execute instructions configured to implement operations for correcting table coordinate information, and the operations may include an operation of each of the list producing unit 121, the grouping execution unit 122, and the coordinate information correction unit 123.

Next, the table coordinate information correction apparatus 120 according to an embodiment of the present disclosure will be described for each element below. Since details of the table coordinate information correction apparatus 120 according to an embodiment of the present disclosure may be inferred from the description of the table coordinate information correction method according to an embodiment of the present disclosure described above, a detailed description thereof will be omitted below.

First, the list producing unit 121 produces a list of first coordinate elements for a first axis or second coordinate elements for a second axis on the basis of coordinate information of a plurality of cells included in a table of a document image.

In addition, the grouping execution unit 122 performs grouping on the list of first coordinate elements or the list of second coordinate elements.

Finally, the coordinate information correction unit 123 corrects coordinate information of the cells of the table on the basis of the first coordinate elements or second coordinate elements on which the grouping was performed.

In addition, the table coordinate information correction apparatus 120 according to an embodiment of the present disclosure does not necessarily receive predetermined input information from the optical document input apparatus 110 through the communication network 130, and may directly receive input information without passing through the communication network 130.

Furthermore, the table coordinate information correction apparatus 120 according to an embodiment of the present disclosure does not necessarily have to be configured as a device separate from the optical document input apparatus 110, and the table coordinate information correction apparatus 120 may be implemented in various forms, such as being integrally formed with the optical document input apparatus 110.

Figure 14:
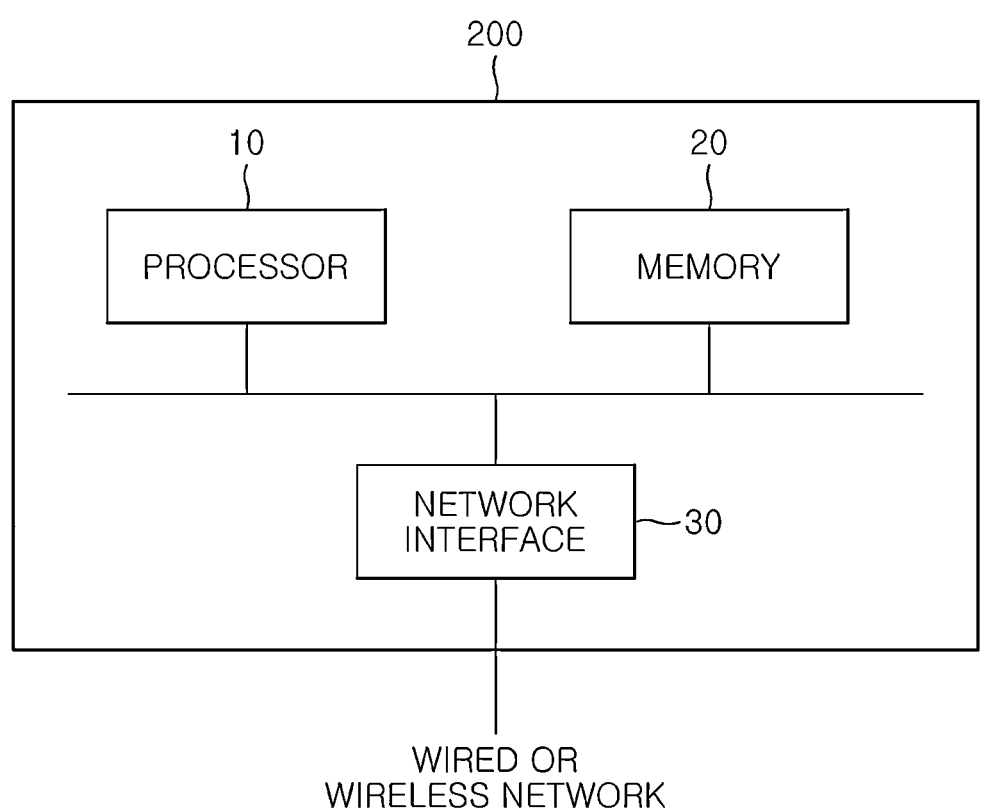
FIG. 14 is a diagram illustrating an apparatus that may be applied as an embodiment of the present disclosure.

FIG. 14 illustrates an apparatus 200 to which the proposed method of the present disclosure may be applied.

Referring to FIG. 14, the apparatus 200 may be configured to implement a table coordinate information correction process according to the proposed method of the present disclosure. For example, the apparatus 200 may be a server device 200 for providing a service of recognizing a table and/or characters while correcting table coordinates.

For example, the apparatus 200 to which the proposed method of the present disclosure may be applied may include network devices such as repeaters, hubs, bridges, switches, routers, gateways, etc., computer devices such as desktop computers, workstations, etc., mobile terminals such as smartphones, etc., portable devices such as laptop computers, etc., home appliances such as digital TVs, etc., transportation means such as cars or the like. As another example, the apparatus 200 to which the present disclosure may be applied may be included as a part of an application-specific integrated circuit (ASIC) implemented in the form of a system-on-chip (SoC).

The memory 20 may be connected to the processor 10 during operation, may store programs and/or instructions for processing and control of the processor 10, and may store data and information used in the present disclosure, control information and data necessary for processing data and information according to the present disclosure, and temporary data produced in processing the information. The memory 20 may be implemented as a storage device such as ROM (read-only memory), RAM (random access memory), EPROM (erasable programmable read-only memory), EEPROM (electrically erasable programmable read-only memory), flash memory, SRAM (static RAM), a hard disk drive (HDD), or a solid state drive (SSD).

The processor 10 may be operatively connected to the memory 20 and/or the network interface 30 during operation and may control the operation of each module in the device 200. In particular, the processor 10 may perform various control functions for performing the proposed method of the present disclosure. The processor 10 may also be referred to as a controller, a microcontroller, a microprocessor, a microcomputer, or the like. The proposed method of the present disclosure may be implemented by hardware, firmware, software, or a combination thereof. In the case of implementing the present disclosure using hardware, an ASIC (application specific integrated circuit), a DSP (digital signal processor), a DSPD (digital signal processing device), a PLD (programmable logic device), an FPGA (field programmable gate array), or the like, which is configured to perform the present disclosure, may be provided in the processor 10. On the other hand, in the case of implementing the proposed method of the present disclosure using firmware or software, the firmware or software may include instructions related to modules, procedures, or functions for performing functions or operations necessary for implementing the proposed method of the present disclosure, and the instructions may be configured to be stored in the memory 20 or stored in a computer-readable recording medium (not shown) separated from the memory 20 such that the apparatus 200 implements the proposed method of the present disclosure when executed by the processor 10.

In addition, the apparatus 200 may include a network interface device 30. The network interface device 30 may be connected to the processor 10 during operation, and the processor 10 may control the network interface device 30 to transmit or receive wireless/wired signals carrying information and/or data, signals, messages, and the like through a wireless/wired network. The network interface device 30 may support various communication standards such as IEEE 802 series, 3GPP LTE(-A), 3GPP 5G, and the like, and transmit and receive control information and/or data signals according to a corresponding communication standard. The network interface device 30 may be implemented outside the apparatus 200 as necessary.

Accordingly, in a method, an apparatus, a system, and a computer program for correcting table coordinate information according to an embodiment of the present disclosure, it is possible to effectively correct errors that may occur in a document recognition process by processing table coordinate information extracted from an image of an input document including a table.

In addition, in a method, an apparatus, a system, and a computer program for correcting table coordinate information according to an embodiment of the present disclosure, it is possible to effectively process table coordinate information while minimizing computational resources required to correct errors.

Furthermore, in a method, an apparatus, a system, and a computer program for correcting table coordinate information, it is possible to prevent errors in electronic documents such as Excel documents produced using a table structure that is inaccurately calculated.

The above embodiments and drawings described in the present specification are provided by way of example only, and are not intended to limit the scope of the present disclosure in any way. In addition, the connections of the lines between the elements or connection members therebetween shown in the drawings are only examples representing functional connections and/or physical or circuit connections, and an actual apparatus may be configured as various replaceable or additional functional connections, physical connections, or circuit connections. In addition, unless stated specifically such as "essential", "importantly", or the like, the embodiment stated herein may not be essential to the application of the present disclosure.

In the specification (especially in the claims) of the present disclosure, when a range is described in the present disclosure, this may include the invention to which respective values included in the range are applied (unless stated otherwise), and may be regarded that the respective values constituting the range are described in the detailed description of the invention. In addition, the steps presented in the method invention of the present disclosure are not necessarily intended to limit the sequence thereof, and the sequence may appropriately vary as necessary unless a certain step must precede other steps according to the nature of each process. All examples or exemplary terms (e.g., "etc.") in the present disclosure are merely provided to describe the present disclosure in detail, and the scope of the present disclosure is not limited by the examples or exemplary terms unless limited by the claims. In addition, those skilled in the art may understand that various modifications, combinations, and changes may be made according to design conditions and elements within the scope of the appended claims or their equivalents.

What is claimed is:

1. A method for correcting table coordinate information for table structure recognition error in optical document recognition, the method being performed by at least one processor of an apparatus including at least one memory and comprising:
    producing, by the at least one processor, a list of first coordinate elements along a first axis or second coordinate elements along a second axis based on coordinate information of a plurality of rectangular cells within a table of a document image, which are extracted by recognizing the lines of the rectangular cells composing the table and including deviation due to the table structure recognition error;
    performing, by the at least one processor, grouping the list of first coordinate elements or the list of second coordinate elements of the rectangular cells of same row or same column of the table based on a size of the first coordinate elements or a size of the second coordinate elements to produce one or more representative values of each group;
    correcting, by the at least one processor, the deviation of the coordinate information of the plurality of rectangular cells of the table using the one or more representative values, based on the first coordinate elements or the second coordinate elements used for grouping; and
    producing an electronic document including a table that matches indices of rows and columns to which the corrected coordinate information is mapped.

2. The method for correcting table coordinate information of claim 1, wherein the producing of the list comprises producing the list of first coordinate elements or second coordinate elements based on the coordinate information of one or more of respective vertices of the plurality of rectangular cells within the table.

3. The method for correcting table coordinate information of claim 2, wherein the producing of the list comprises producing each of the lists of first coordinate elements and second coordinate elements based on the coordinate information of upper left vertices and lower right vertices of the plurality of rectangular cells within the table.

4. The method for correcting table coordinate information of claim 2, wherein the producing of the list comprises producing each of the lists of first coordinate elements and second coordinate elements based on the coordinate information of one vertex at a predetermined position among the vertices of the plurality of rectangular cells within the table.

5. The method for correcting table coordinate information of claim 1, wherein the producing of the list comprises producing each of lists by sorting the first coordinate elements and the second coordinate elements according to sizes thereof.

6. The method for correcting table coordinate information of claim 5, wherein the performing of the grouping comprises sequentially performing grouping on each sorted list in order of size of each coordinate element.

7. The method for correcting table coordinate information of claim 6, wherein the performing of the grouping comprises performing grouping in consideration of sizes of characters included in the table.

8. The method for correcting table coordinate information of claim 7, wherein the performing of the grouping comprises
if the size of the coordinate element on which the grouping is sequentially performed falls within a range obtained by adding and subtracting an average value of sizes of the characters to and from a representative value of a current group, including the coordinate element in the current group, and
if the size of the coordinate element falls outside of the range, producing a new group and including the coordinate element in the new group.

9. The method for correcting table coordinate information of claim 1, wherein the correcting of the coordinate information comprises correcting the coordinate information of the plurality of rectangular cells of the table using the one or more representative values of each of the groups of first coordinate elements and second coordinate elements used for grouping.

10. The method for correcting table coordinate information of claim 1, wherein the producing the electronic document comprises producing the electronic document including a table that matches indices of rows and columns, of which coordinate information has been corrected based on the one or more representative values of each of the groups of first coordinate elements and second coordinate elements used for grouping.

11. A non-transitory computer-readable storage medium storing instructions configured to cause, when executed by at least one processor, an apparatus including the at least one processor and at least one memory to implement an operation of correcting table coordinate information for table structure recognition error in optical document recognition, the operation comprising:
producing, by the at least one processor, a list of first coordinate elements for a first axis or second coordinate elements for a second axis on the basis of coordinate information of a plurality of rectangular cells included in a table of a document image and extracted by recognizing the lines of the rectangular cells composing table and including deviation due to the table structure recognition error;
performing, by the at least one processor, grouping on the list of first coordinate elements or the list of second coordinate elements of the rectangular cells of same row or same column of the table based on a size of the first coordinate elements or the size of the second coordinate elements to produce one or more representative values of each group;
correcting, by the at least one processor, the deviation of the coordinate information of the plurality of rectangular cells of the table using the one or more representative values on the basis of the first coordinate elements or the second coordinate elements on which the grouping was performed; and
producing, by the at least one processor, an electronic document including a table that matches indices of rows and columns to which the corrected coordinate information is mapped.

12. A table coordinate information correction apparatus for table structure recognition error in optical document recognition including at least one processor and at least one memory configured to:
produce, by the at least one processor, a list of first coordinate elements for a first axis or second coordinate elements for a second axis on the basis of coordinate information of a plurality of rectangular cells included in a table of a document image and extracted by recognizing the lines of the rectangular cells composing the table and including deviation due to the table structure recognition error;
perform, by the at least one processor, grouping on the list of first coordinate elements or the list of second coordinate elements of the rectangular cells of same row or same column of the table based on a size the first coordinate elements or the second coordinate elements to produce one or more representative values of each group;
correct, by the at least one processor, the deviation of the coordinate information of the plurality of rectangular cells of the table using the one or more representative values on the basis of the first coordinate elements or the second coordinate elements on which the grouping was performed; and
produce, by the at least one processor, an electronic document including a table that matches indices of rows and columns to which the corrected coordinate information is mapped.

13. The table coordinate information correction apparatus of claim 12, wherein, in producing the lists, the lists of first coordinate elements or second coordinate elements is produced on the basis of coordinate information of one or more of respective vertices of the plurality of rectangular cells included in the table.

14. The table coordinate information correction apparatus of claim 13, wherein, in producing the list, each of the lists of first coordinate elements and second coordinate elements is produced on the basis of coordinate information of one vertex at a predetermined position among the vertices of the plurality of rectangular cells included in the table.

15. The table coordinate information correction apparatus of claim 12, wherein, in producing the list, each of lists is produced by sorting the first coordinate elements and the second coordinate elements according to sizes thereof.

16. The table coordinate information correction apparatus of claim 15, wherein, in performing the grouping, the grouping is sequentially performed on each sorted list in order of size of each coordinate element.

17. The table coordinate information correction apparatus of claim 16, wherein, in performing the grouping, the grouping is performed in consideration of sizes of characters included in the table.

18. The table coordinate information correction apparatus of claim 17, wherein, in performing the grouping, if the size of the coordinate element on which the grouping is sequentially performed falls within a range obtained by adding and subtracting an average value of sizes of the characters to and from a representative value of a current group, the coordinate element is included in the current group, and if the size of the coordinate element falls outside of the range, a new group is produced and the coordinate element is included in the new group.

19. The table coordinate information correction apparatus of claim 12, wherein, in correcting the coordinate information, the coordinate information of the plurality of rectangular cells of the table is corrected on the basis of a representative value of each of the groups of first coordinate elements and second coordinate elements on which the grouping was performed.

20. The table coordinate information correction apparatus of claim 12, wherein, in producing the electronic document, the electronic document includes a table that matches indices of rows and columns, of which coordinate information has been corrected on the basis of a representative value of each of the groups of first coordinate elements and second coordinate elements on which the grouping was performed.

* * * * *